US010779666B2

(12) United States Patent
Fenelon

(10) Patent No.: US 10,779,666 B2
(45) Date of Patent: Sep. 22, 2020

(54) POLYMERIC REPLACEMENT FOR A GLASS DRINKING CONTAINER

(71) Applicant: Cailis, LLC, Cleveland, TN (US)

(72) Inventor: Paul J. Fenelon, Nashville, TN (US)

(73) Assignee: Cailis, LLC, Cleveland, TN (US)

( * ) Notice: Subject to any disclaimer, the term of this patent is extended or adjusted under 35 U.S.C. 154(b) by 277 days.

(21) Appl. No.: 15/464,197

(22) Filed: Mar. 20, 2017

(65) Prior Publication Data

US 2017/0188729 A1 Jul. 6, 2017

Related U.S. Application Data

(62) Division of application No. 13/654,410, filed on Oct. 17, 2012, now abandoned.
(Continued)

(51) Int. Cl.
*B29C 70/68* (2006.01)
*A47G 19/22* (2006.01)
(Continued)

(52) U.S. Cl.
CPC ........ *A47G 19/2205* (2013.01); *B29C 70/682* (2013.01); *B29C 70/72* (2013.01);
(Continued)

(58) Field of Classification Search
CPC ........ A47G 19/2205; B29L 2031/7132; B65D 21/0233; B29C 70/72; B29C 70/682;
(Continued)

(56) References Cited

U.S. PATENT DOCUMENTS 3,057,016 A * 10/1962 Schilling ................. B29C 45/16
215/12.2
3,647,614 A * 3/1972 Cleereman ............. B29C 43/16
264/122
(Continued)

FOREIGN PATENT DOCUMENTS

DE 19934609 A1 1/2001
DE 20009051 U1 1/2001
(Continued)

OTHER PUBLICATIONS

Mexican Office Action of corresponding Mexican Application No. MX/a/2014/004565, dated Aug. 20, 2018.
(Continued)

*Primary Examiner* — Nathan H Empie
(74) *Attorney, Agent, or Firm* — William E. Sekyi; Patterson Intellectual Property Law, PC

(57) ABSTRACT

A polymeric replacement vessel, or container, for glassware and glass containers and a method of making the same. polymeric drinking container simulates a glass drinking container having a glass drinking container volume. The polymeric drinking container comprises a base and an enclosed wall composed of the polymer. The wall is formed with the base and extends from the base while defining an opening opposite the base. The enclosed wall includes an inside surface and an outside surface. The base and enclosed wall form a polymeric drinking container volume made of the polymeric material. This polymeric drinking container volume is equal to the glass component drinking container volume plus an amount equal to the glass component drinking container volume multiplied times the ratio of the specific gravity of the glass to the specific gravity of the polymer.

8 Claims, 8 Drawing Sheets

Related U.S. Application Data

(60) Provisional application No. 61/627,659, filed on Oct. 17, 2011.

(51) Int. Cl.
  *B29C 70/72* (2006.01)
  *B65D 21/02* (2006.01)
  *B29K 105/20* (2006.01)
  *B29L 31/00* (2006.01)

(52) U.S. Cl.
  CPC ...... *B65D 21/0233* (2013.01); *B29K 2105/20* (2013.01); *B29L 2031/7132* (2013.01)

(58) Field of Classification Search
  CPC ..... B29C 33/02; B29C 33/005; B29C 33/306; B29C 45/14; B29C 45/14819; B29C 45/1675; B29C 45/1679; B29C 2045/1709; B29C 2045/2677; B29C 45/73; B29C 45/7312; B29C 2045/7343; B29C 2045/7318
  See application file for complete search history.

(56) References Cited

U.S. PATENT DOCUMENTS

| | | |
|---|---|---|
| 3,797,696 A | 3/1974 | Dibrell |
| 3,897,899 A | 8/1975 | Schuff et al. |
| D283,387 S | 4/1986 | Durand |
| 4,822,543 A * | 4/1989 | Iizuka ................... B29C 49/64 |
| | | 264/235 |
| 6,065,603 A | 5/2000 | Filice et al. |
| 6,105,814 A | 8/2000 | Chen |
| 6,398,019 B1 | 6/2002 | Cheng |
| D553,440 S | 10/2007 | Bodum |
| 2002/0198307 A1 * | 12/2002 | Jalan ..................... C08K 3/26 |
| | | 524/493 |
| 2009/0110855 A1 * | 4/2009 | McCarthy ............... B32B 1/02 |
| | | 428/35.7 |

FOREIGN PATENT DOCUMENTS

| | | |
|---|---|---|
| DE | 19949457 A1 | 4/2001 |
| DE | 20306806 U1 | 9/2003 |
| DE | 202008015026 U1 | 5/2009 |
| GB | 2439140 A | 12/2007 |
| KR | 200242054 Y1 | 10/2001 |
| WO | 0034138 A1 | 6/2000 |

OTHER PUBLICATIONS

International Search Report in corresponding International Application No. PCT/US2012/060696, dated Dec. 6, 2012, 4 pp.

Polysafe Unbreakable Drinkware; "Polysafe Unbreakable Drinkware"; Website; Purported Date of Jun. 16, 2011; 5 pages, Internet Publication.

L. A. Utracki, Polymer Blends Handbook, Appendix I, International Abbreviations for Polymers and Polymer Processing, National Research, Council Canada, Industrial Materials, Institute, Boucherville, QC, Canada, 2003, 240 pages, Kluwer Academic Publishers, The Netherlands.

* cited by examiner

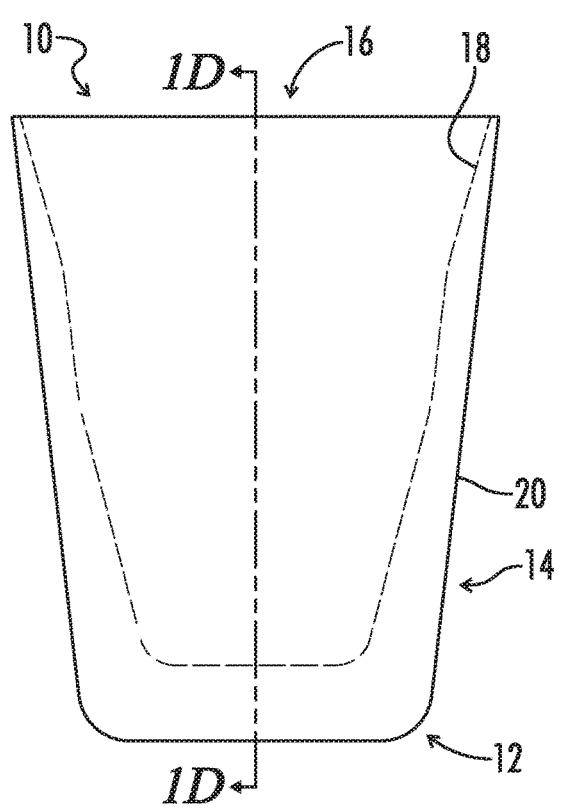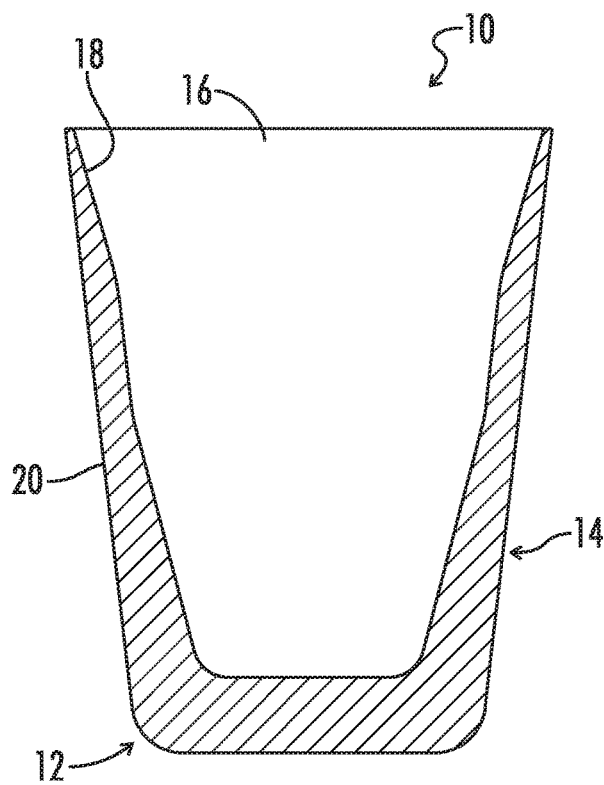
FIG. 1C
FIG. 1D

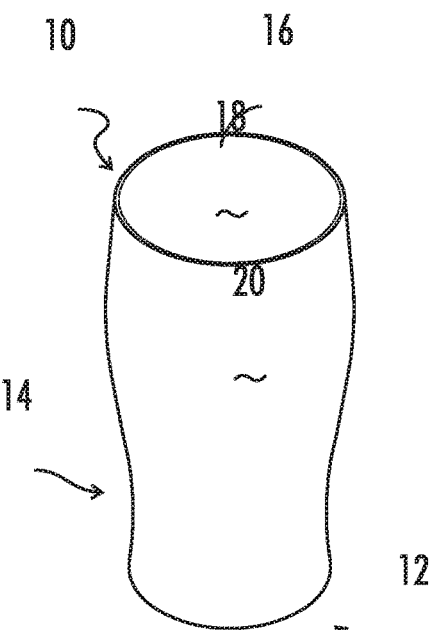
*FIG. 6A*
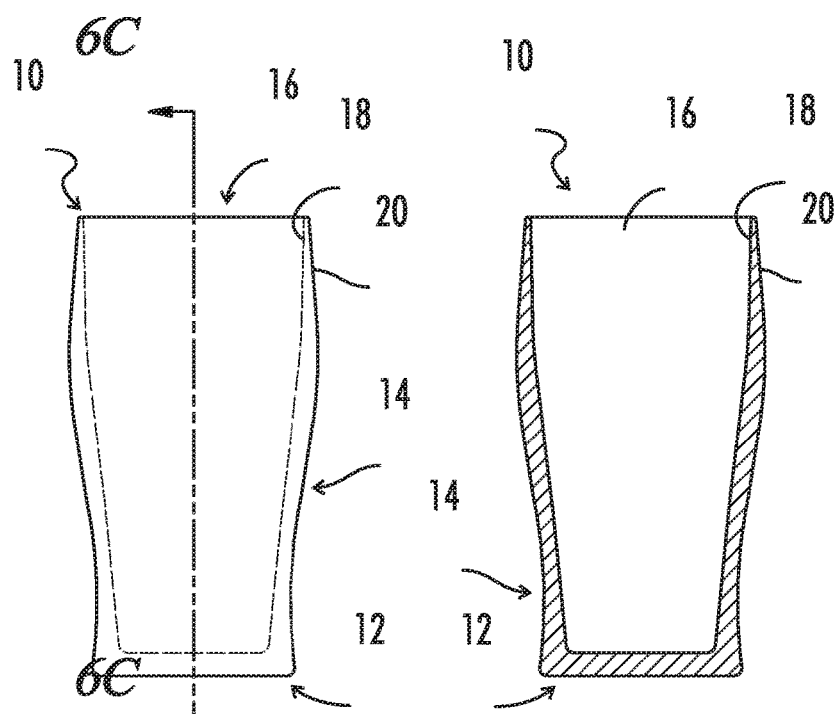
*FIG. 6B*   *FIG. 6C*   *FIG. 6D*

POLYMERIC REPLACEMENT FOR A GLASS DRINKING CONTAINER

CROSS-REFERENCES TO RELATED APPLICATIONS

This application is a divisional of U.S. patent application Ser. No. 13/654,410 filed on Oct. 17, 2012, which claims priority to provisional patent application Ser. No. 61/627,659 filed on Oct. 17, 2011.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present disclosure relates generally to the use of a polymeric material to create a drinking container that is similar in functionality to a glass drinking container without the drawbacks of the glass material. More particularly, the current disclosure is directed at a polymeric drinking container, and a method of making the same, such that the drinking container has the same "weighted feel," transparency, and rigidity as glass without having the brittle nature of glass.

It is known in the art to use glass material to make many items associated with the consumption of food and beverages. These items are typically containers or vessels that can fall into a multitude of categories including beverage containers and food containers. Numerous categories of beverage containers include glassware and beverageware, or drinkware. Which can be further described as barware, glassware, crystal, and stemware. Glassware can include beverage containers of all kinds and various plates, platters, pitchers, decorative items and the like, used in the consumption of food and beverage.

The use of soda lime glass is typically the glass of choice in these beverage containers. The soda lime glass is an inorganic composition that is made up of typically inexpensive and readily available ingredients. This type of glass has many acceptable features that are beneficial in these beverage containers. These acceptable features include exceptional transparency and clarity along with a Moh hardness of 6.1 that provides scratch resistance. Soda lime glass has a density of 2.52 grams per cubic centimeter, which yields a characteristic "heavy weighted feel" to a use of the glass beverage containers. Additionally, it has a high melting point (1024 degrees centigrade) which provides a useful resistance to wear and deterioration from household and commercial cleaning products, surfactants and scrubbers.

Unfortunately, the soda lime glass has several unacceptable characteristics and features when used in beverage containers. For example, one huge issue is the fact that the soda lime glass is very brittle and is thus prone to breaking. This breakage creates two issues: reduces the useful life span of the glass beverage containers and creates a safety issue upon breakage.

Due to the brittle nature of the glass, the glass beverage containers have a tendency to break, sometimes in just normal handling and cleaning. This breakage requires employee to clean up the breakage and additional supplies of the glass containers to replace the broken containers. This breakage reduces the useful life and increases the cost for those glass beverage containers.

Glass beverage containers also have potential health hazards due to shards, splinters, knife-like edge pieces, etc., that can pierce and cut the skin. This hazard is so detrimental to workers and patrons in the United Kingdom that the British Government has instituted a directive to improve the safety of glassware in restaurants, bars, pubs and clubs. The directive, issued in an article entitled "Design Out Crime," includes a forward by Alan Campbell, the United Kingdom's Parliamentary Under Secretary of State, that article outlines the issues with glass containers, such as beer glasses or bottles. The article explained that glass containers can be dangerous and cause many issue when accidentally broken, but they can be a huge issue if purposely broken and used as weapons. In this article, the British Government asked for improvements to the glass material or alternatives to the current glass material used in drinking containers. The British Government asked for improved glassware that increased the safe use of that glassware, while trying to give a similar drinking experience to the drinking consumer as the current glassware.

Further, the actual brittleness of the glass requires the glass beverage container to have a rounded thick lip at the open end, or mouth, in order to protect a user from actually cutting themselves during proper use of that glass beverage container.

Additionally, soda lime glass is a high melting composition. This requires high energy to manufacture the glasses, which again increases costs. Additionally, the glass has a thermal conductivity that facilities a transfer of heat between the contents within the glass and the external atmosphere. This leads to the glass "sweating" and "dripping" when filled with liquids that are colder than the ambient air temperature. This "sweating" can cause the glass beverage container to slip or drop from the hand of a user when wet leading to the afore mentioned breaking. Additionally, the "sweating" necessitates protection for whatever service upon which the glass is set in the form of coasters, beverage sleeves, table cloths, and even protective coatings on wood and the like. Again, this raises the dangers and associated cost for the restaurant, bar, pub, etc.

The move to polymeric material for glass replacement has been slow. This is due to the lack of the same experience provided to the drinkware user and the difficulties in the manufacturing of the polymeric material. In a conventional molding operation, the mold is comprised of a cavity area and a core area and divided into two halves. During the molding process, parting lines in the molded part are formed at the joints of the two halves of the mold. This is due to a portion of the thermoplastic/polymeric material that is injected into the mold seeping through those joints. This creates "parting lines" which typically then are removed during a finishing process that adds expense and can be aesthetically unappealing.

Another issue with conventional drinkware in restaurants, bars, pubs, and the like is the transport of those from location to location. Typically these drinking containers are moved stacked inside one another and yet are not designed to properly hold their position when so stacked. Typically these drinking containers have a single point of contact once stacked inside another container of a similar geometric shape. This facilitates sliding and movement of the top container with respect to the bottom container. Once several of these drinking containers are stacked on top of each other, the top containers tend to exaggerate this sliding movement and fall over to one side, typically falling outside the footprint of the bottom container therefore causing a tumbling and/or falling effect of the stacked drinking containers.

What is needed then is an acceptable alternative to glass vessels or glass containers, especially for beverage containers or drinkware. Preferably these improved containers will have a clarity equivalent to glass along with a "weighted feel" that is similar to the glass container that it replaces. Additionally, the improved container is preferably shatter resistant, crush resistant and cleaning detergent and dishwasher safe. Additionally, the improved container preferably has a resistance to stress cracking and discoloration while having good surface aesthetics. The needed improved container is preferably compliant with all regulations of the Food and Drug Administration and be economically viable. This needed improved container for glass containers is lacking in the art.

BRIEF SUMMARY OF THE INVENTION

Disclosed herein is a polymeric replacement vessel, or container, for glassware and glass containers. Also included is a method of making such a polymeric replacement container. The polymeric replacement container incorporates the beneficial features of glass while substantially eliminating many of the non-beneficial features of glass when used in similar containers. The polymeric container is both economically and functionally achievable through the use of thermoplastic materials and novel architectural manufacturing techniques. Both clear thermoplastic materials and filled thermoplastic materials, those with additives, can be utilized with the inventive architectural features to create the novel and unique polymeric replacement containers.

The polymeric replacement container is preferably a polymeric drinking container and includes several characteristics similar to a glass drinking container. These characteristics can be achieved through the design of the polymeric drinking container and the manufacturing processes used to create that polymeric drinking container.

The polymeric drinking container simulates a glass drinking container having a glass drinking container volume. The polymeric drinking container comprises a base and an enclosed wall composed of the polymer. The wall is formed with the base and extends from the base while defining an opening opposite the base. The enclosed wall includes an inside surface and an outside surface. The base and enclosed wall form a polymeric drinking container volume made of the polymeric material. This polymeric drinking container volume is equal to the glass component drinking container volume plus an amount equal to the glass component drinking container volume multiplied times the ratio of the specific gravity of the glass to the specific gravity of the polymer.

The volume of the glass drinking container ($\Delta V_G$) that is to be replaced by the polymeric drinking container can be described as being the external volume of the glass container ($EV_G$) minus the internal volume of the glass container ($IV_G$) as seen in the following equation:

$$\Delta V_G = EV_G - IV_G$$

Additionally, generally the volume of the polymeric drinking container ($\Delta V_P$) can be described as the external volume of the polymeric drinking container ($EV_P$) minus the internal volume of the polymeric drinking container ($IV_P$), as shown in the following equation:

$$\Delta V_P = EV_P - IV_P$$

(Note $IV_P$ is equal to $IV_G$, since internal volume remains unchanged) Since the specific gravity and/or density of the glass is typically greater than that of polymeric materials, in order to get an equal weight of the polymeric drinking container to the glass drinking container, which gives the "equal weighted feel" to the user, an additional volume of the polymeric material is required in the polymeric drinking container. As such, the equivalent volume of polymeric material can be described as equaling the volume of the glass drinking container ($\Delta V_G$) plus an ideal added volume of polymeric material ($\Delta V_{PE}$). This added volume of polymeric material is the added volume of polymeric material that gives the equal "weighted feel" of the polymeric drinking container to that of the glass drinking container.

In actuality, the amount of polymeric volume added does not have to equate to this ideal added volume of polymeric material. For example, the actual added volume of polymeric material ($\Delta V_{PA}$) used to simulate the glass drinking container can range between 0.7 to 1.3 times the ideal volume of added polymeric material ($\Delta V_{PE}$). Alternate ranges can include 0.8 to 1.2 times the amount of $\Delta V_{PE}$, and 0.9 to 1.1 times $\Delta V_{PE}$. In a more preferred embodiment, the $\Delta V_{PA}$ ranges between 0.7 and 1.0 times $\Delta V_{PE}$, more preferably between 0.8 to 1.0 times $\Delta V_{PE}$ and most preferably between 0.81 and 1.0 times $\Delta V_{PE}$.

Additionally, the polymeric drinking container can maintain design aesthetics and dimension ratios by proportionally increasing the dimensions of the polymeric drinking container in relation to the glass drinking container. This increase of dimensions can take into account the square dependency of volume on the diameter of the polymeric drinking container and the linear dependency of volume on the length of the polymeric drinking container. In this polymeric drinking container the percentage of increase of added polymer material ($\Delta V_{P+}$) with respect to the external volume of the glass container ($EV_G$) can be calculated as follows:

$$\Delta V_{P+} = \frac{(\Delta V_{PA} - \Delta V_G)}{EV_G} \times 100$$

This equation yields the percentage increase in the material volume to ideally achieve the same "weighted feel" of the polymeric drinking container in relation to the glass drinking container being replaced.

Experimentation has also shown that the increases in the volume of the polymeric material should preferably be proportionally divided between the diameter and length of the polymeric drinking container to maintain the similar user experience in that the polymeric drinking container in relation to the glass drinking container being replaced. For example, the increase in the diameter and lengths of the polymeric drinking container can be increased as a factor of the percentage of increase of added polymer material ($\Delta V_{P+}$). These increases can range between 0.25 and 0.41 of the $\Delta V_{P+}$. More preferably, these increases are between 0.30 and 0.36 of the $\Delta V_{P+}$ and preferably at 0.333 of the $\Delta V_{P+}$.

Additionally, a polymeric drinking container made in accordance with the current disclosure is designed with little to no visible parting lines in the final drinkware. This can be accomplished during the molding process by using additional cooling lines at the seams of the mold. Preferably the mold which can include the core and cavity, with the core making the internal shape of the container in which the liquid is held during use and the cavity establishing the external shape of the container. The actual volume of the container is formed between the cavity and core using normal polymer/thermoplastic molding technologies.

However, in the current inventive design, cooling lines are spread within the mold to help solidify the polymer/thermoplastic within that mold. This design includes various independent cooling lines spread throughout the cavity and specifically calibrated to provide different temperatures at the location of the connection locations of the mold. These temperatures are such that the temperature of the cooling lines at those mold assembly locations is less than the temperature of the cooling lines at the other cooling line locations within the mold and/or cavity. This reduced temperature at the traditional "parting line" location hastens the solidification of the thermoplastic/polymeric material within the mold at those locations. This early stage solidification increases the viscosity of the polymeric material at those locations thereby reducing and/or eliminating the movement of the polymeric material in the cracks of the mold. This lack of movement reduces, or eliminates, the visible parting lines that plague a typical thermoplastic mold parts. In turn, this removes the need for carrying out secondary finishing operations such as flame treatments, polishing, buffing, and the like.

Another feature of a polymeric replacement container made in accordance with the current disclosure includes a multiple over molded container. In this embodiment a fixed core is used as a first layer or first volume of the container. That core is inserted into incrementally increasing cavities where additional over molded layers or volumes of polymeric material are applied to the core layer. Each layer can be allowed to cool and solidify into a piece that is removable. Each subsequent layer can then be inserted into another incrementally larger cavity and an additional layer of polymeric material can be overmolded onto the first two layers. This process can continue until these desired volume and weight are achieved. This process can allow the insertion of decorative designs and visual markings within the layers in between their applications. These techniques can include the insertion of indicia, such as messages and logos in between the layers as well as the inclusion of patterns, colors, alternate materials, and the like in between the various layers. There can also be included various markers, thermochromatic elements and the like within the various layers. For example, thermochromatic layers that are responsive to temperature change can be inserted in between the core and the second layer to benefit the most from the temperature change by the addition of a cool or hot liquid within the container. Also various diffraction patterns can be included on the outer layers which maximize the light diffraction which allows an aesthetically pleasing look without compromising the internal integrity of the container made with the overmolded layers.

Additionally, a primary replacement container in accordance with the current disclosure can be made by the use of a single core segment to generate a family of products. In this embodiment the same core can be used to form a base drinking vessel, such as a stemless wine glass, and then through the use of an over-molding process various stem lengths can be added as desired. These stem lengths can create a short stem, a standard stem, or a long stem to simulate standard wine glasses, chalices, fine crystal glasses and the like.

Additionally, an embodiment of the polymeric replacement container can have physical characteristics that allow secured stacking of those containers.

The improved polymeric drinking container includes external and internal geometric shapes such that a portion of the lower outside diameter is larger than a portion of the internal diameter of a container. Additionally, the angle of the inside diameter with respect to the base of the container can be approximately equal to the angle of the outside diameter with respect to the base of the container. In this design, the angles of the outside and inside diameters will substantially match such that as the two containers are inserted one in the other the outside diameter of the first container will engage a portion of the inside diameter that substantially matches its angle in relation to the base and its diameter. This increases the surface contact between the stacked polymeric drinking containers thereby reducing the toppling effect and allowing easy transport of the polymeric drinking containers in such a fashion.

It is therefore a general object of the current disclosure to provide an improved polymeric replacement container for a glass container.

Another object of the present disclosure is to provide an improved polymeric drinking container.

Still another object of the current invention is to provide a polymeric container that has beneficial characteristics of a glass container while reducing or eliminating non-beneficial characteristics.

Yet another object of the current disclosure is to provide a polymeric container that has the "weighted fill" of a glass container.

Another object of the current disclosure is to provide a polymeric container that has little to no visible parting lines from the manufacturing process.

Other and further objects, features and advantages of the present disclosure will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 1C is a side view of a container as shown in FIGS. 1A-1B.

FIG. 1D is a cross sectional view taken along Line AA in FIG. 1C.

FIG. 6A is a top perspective view of a polymeric container made in accordance with the current disclosure.

FIG. 6B is a side view of the container shown in FIG. 6A.

FIG. 6C is a cross sectional view taken along Line A-A of FIG. 6B.

FIG. 6D is a side view of the container shown in 6A shown in a stacked relationship.

DETAILED DESCRIPTION OF THE INVENTION

Figure 1A:
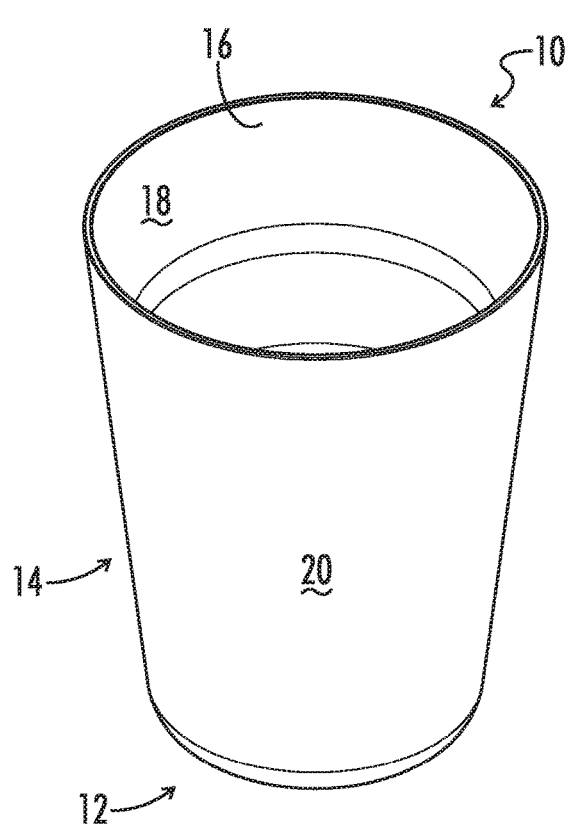
FIG. 1A is a top perspective view of a polymeric container made in accordance with the current disclosure.
Figure 1B:
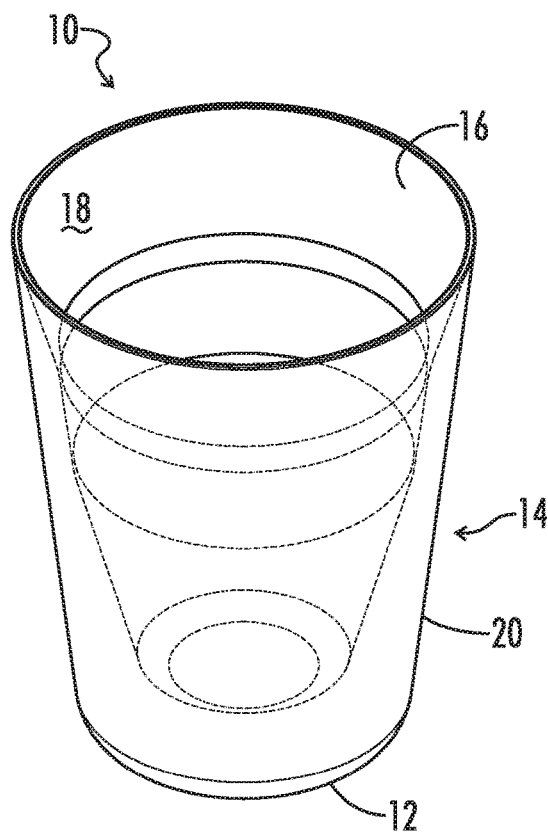
FIG. 1B is a view similar to FIG. 1A showing a relation of the internal volume within the container.
Figure 2:
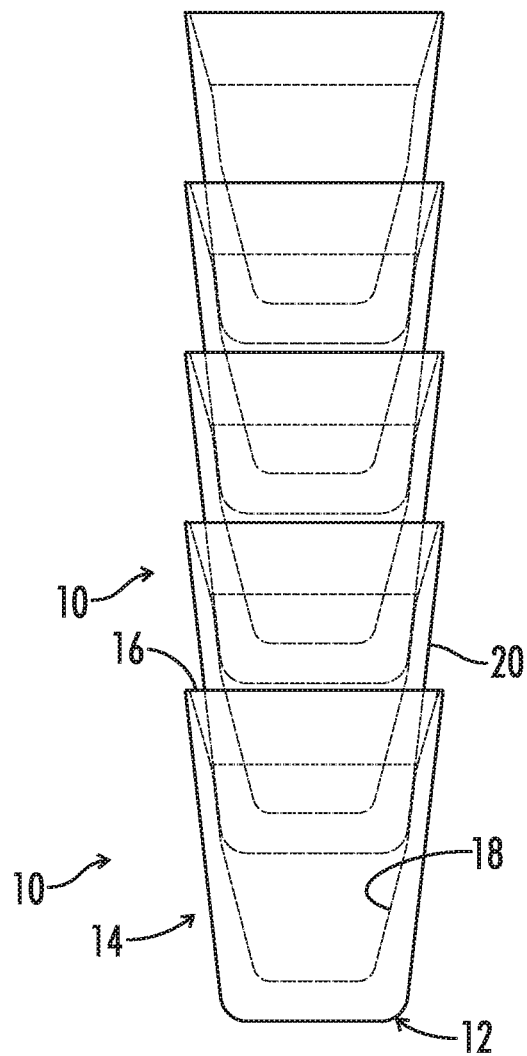
FIG. 2 is a partial cutaway illustration of polymeric containers made in accordance with the current disclosure in a stacked relationship.
Figure 3C:
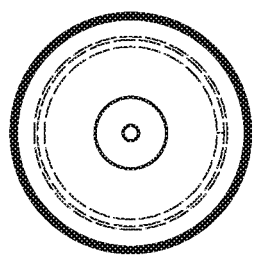
FIG. 3C is a top view of the container shown in FIG. 3A.
Figure 3A:
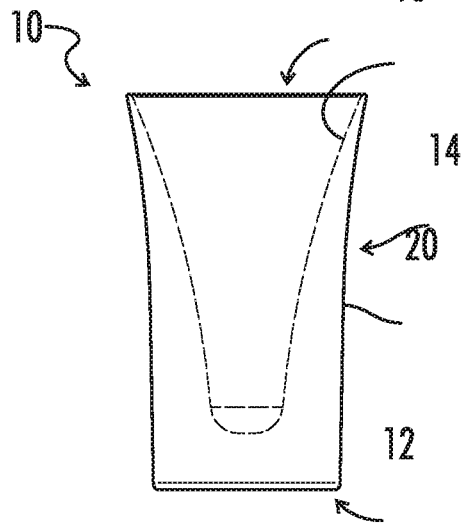
FIG. 3A is a side view of an alternate polymeric container made in accordance with the current disclosure.
Figure 3B:
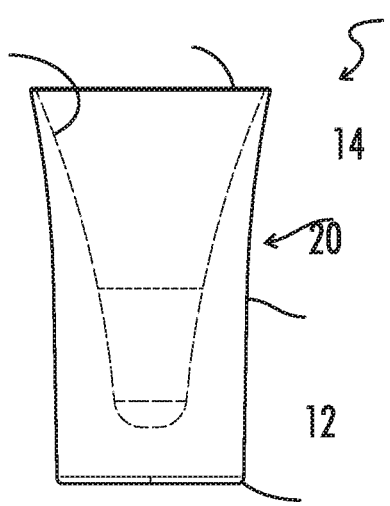
FIG. 3B is a side view similar to FIG. 3A showing the internal volume of the polymeric container.
Figure 3D:
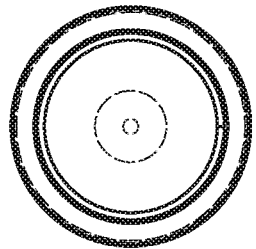
FIG. 3D is a bottom view of the container shown in FIG. 3A.
Figure 4A:
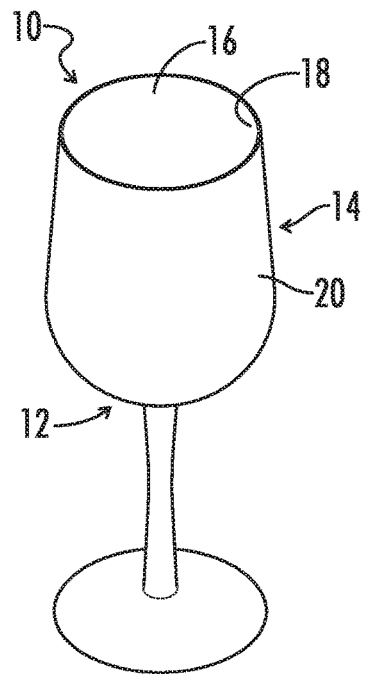
FIG. 4A is a top perspective view of an alternate polymeric container made in accordance with the current disclosure.
Figure 4C:
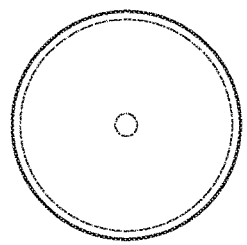
FIG. 4C is a top view of the container shown in FIG. 4B.
Figure 4B:
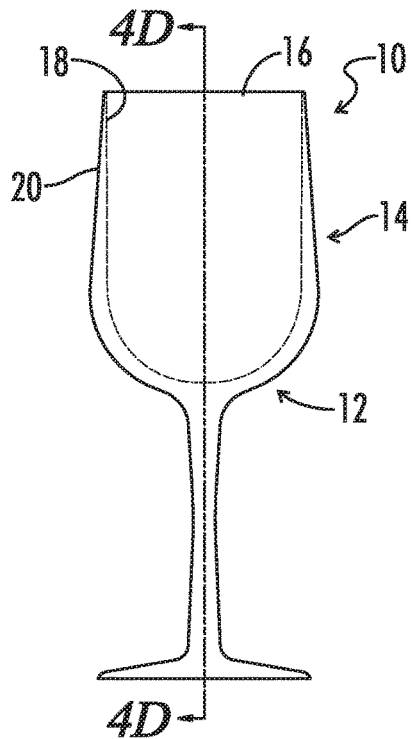
FIG. 4B is a side view of the container shown in FIG. 4A.
Figure 4D:
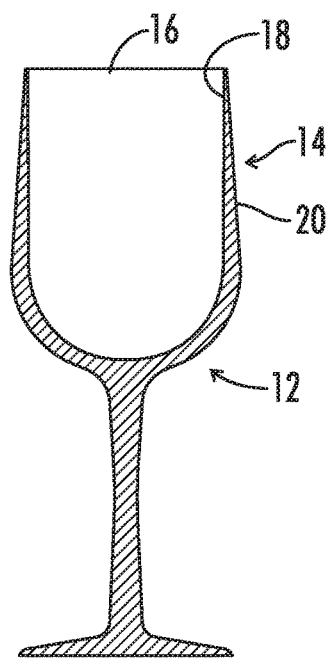
FIG. 4D is a cross sectional view along Line A-A in FIG. 4B.
Figures 5A, 5B:
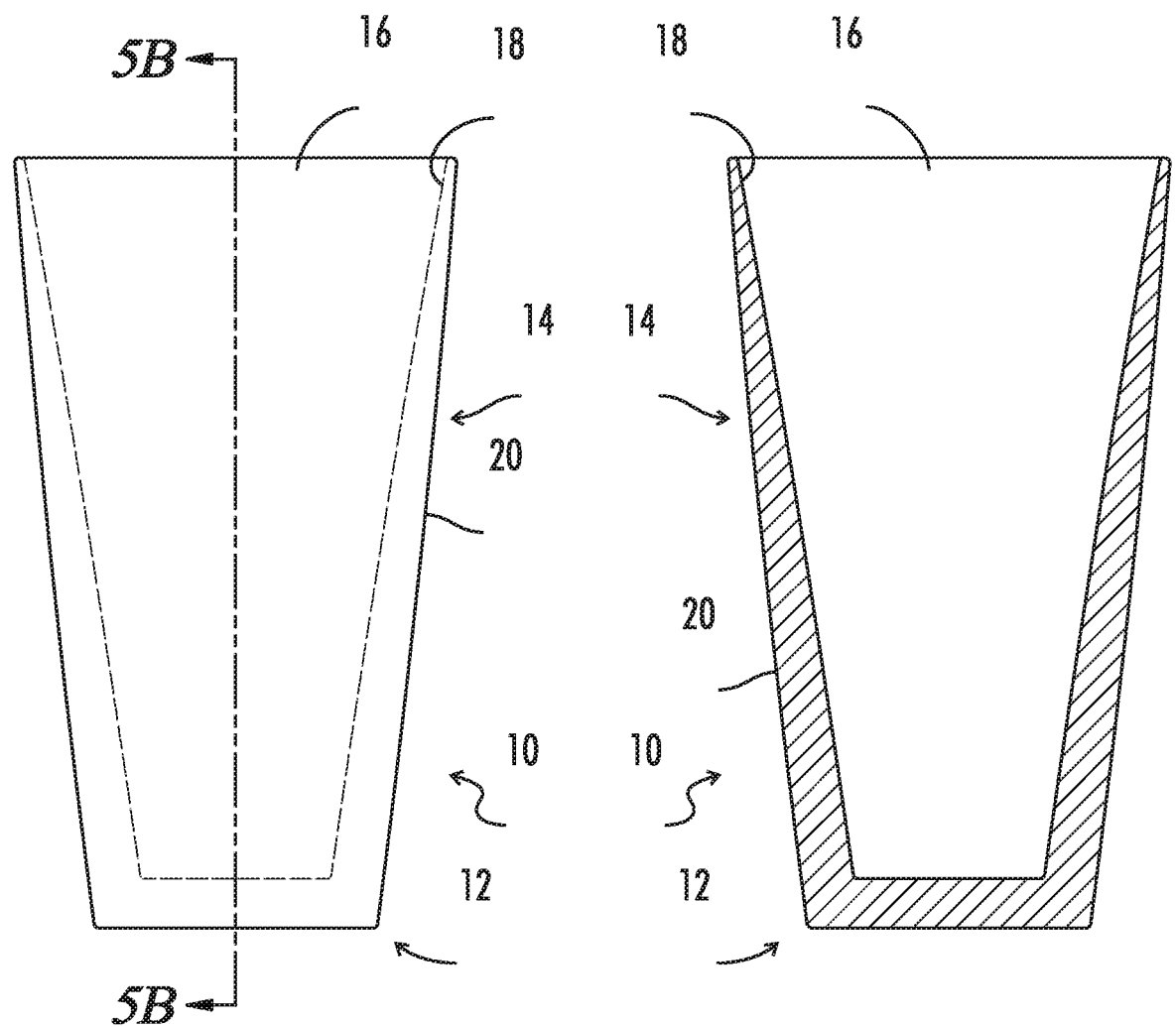
FIG. 5A is a side view of an alternate container made in accordance with the current disclosure.
FIG. 5B is a cross sectional view taken along Line B-B of FIG. 5A.
Figure 7:
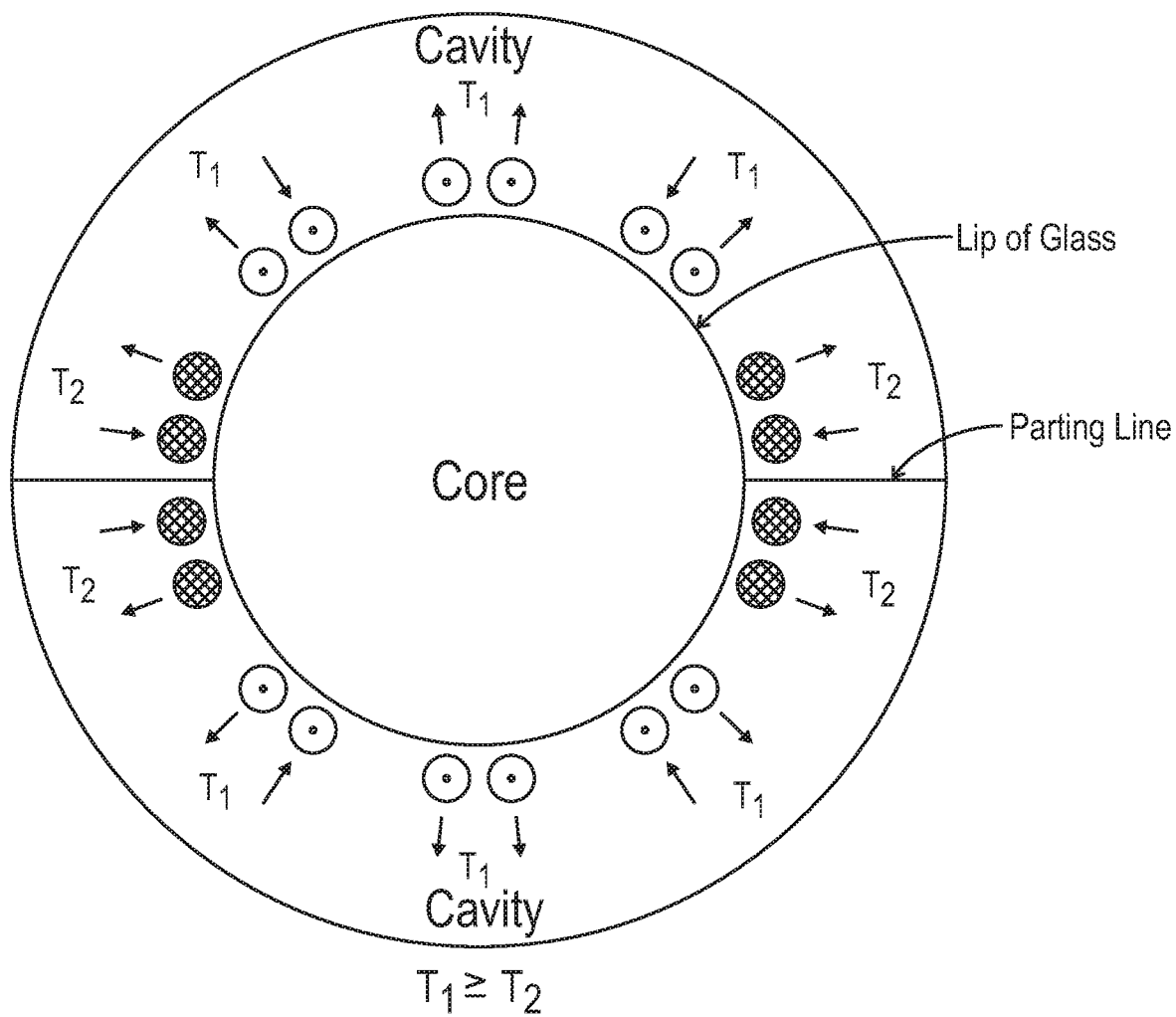
FIG. 7 is a schematic view of a mold showing a process of making a polymeric container in accordance with the current disclosure.

Referring generally now to the Figures, a polymeric container can be shown and generally illustrated by the numeral 10. The container includes a base 12 and an enclosed wall 14. The enclosed wall 14 can be formed with the base 12 and extends from the base 12 and defines an opening 16, or a mouth 16, opposite the base 12. The wall includes an inside surface 18 and an outside surface 20.

The polymeric material is preferably a thermoplastic and can be a clear engineering thermoplastic or a filled engineering thermoplastic. For example a clear engineering thermoplastic can include PET, PETG, SAN, PC, TPX, PVC, and the like. The filled engineering thermoplastics can be thermoplastics, such as can be polypropylene, polyethylene, PET, PVC, and the like, filled with additives such as Mica, Calcium Carbonate, Talc, Aluminum Silicate, and the like. Either of these thermoplastics can be the molded compounds used to form the container structures and base. Further, the base can be intricately molded with a heavy walled streamlined configuration. This facilitates the elimination of voids during the melting and formation processing, including the cooling of the base during the manufacture. Alternately, the base can be intricately molded around an insert or filler that is suitably sized and shaped to provide part of the weight of the base.

The polymeric container 10 is preferably a drinking container, or drinkware, as used to hold a liquid for consumption by a user. The polymeric container 10 is designed to simulate a glass container and provide a similar user experience as the glass container without having various drawbacks of that glass container. Given the variations and the properties of glass and polymers, alterations in the polymeric container design are used to provide that same "user experience" as the glass container.

For example, the polymeric drinking container as composed of the base and enclosed wall, has a polymeric drinking container volume of the polymeric material that simulates the drinking glass container volume for which it replaces. This polymeric drinking container volume is approximately equal to the glass drinking container volume plus the added volume of polymer material needed to achieve the approximate equivalent weight of the glass container in the polymeric container. This added volume is approximately equal to the volume of the glass, which is the external volume of the glass container minus the internal volume of the glass container, multiplied times the ratio of specific gravity of the glass to the specific gravity of the polymer chosen.

Table 1 includes a listing of specific gravities of some polymers that could be used to create the polymeric drinking container as disclosed. The volume of polymeric material used to create a polymeric drinking container made in accordance with the current disclosure can be configured based upon the specific gravity ratio of the glass of the container of which is replaced, typically soda lime glass, in relation to the specific gravity of the polymer/thermoplastics chosen for the polymeric container.

In a preferred embodiment this volume of polymeric material is configured such that the weight of the polymeric container almost exactly equals the weight of the glass container being replaced. In actuality though, experiments have shown that a different volume of added polymeric material that is actually used ($\Delta V_{PA}$) will work, give more than satisfactory results, and maintain both functionality and economic viability. This range of $\Delta V_{PA}$ can be expressed as a percentage amount of the ideal volume of polymeric material used added to the initial starting volume to create the desired polymeric container.

The starting point to establish the ideal volume for the polymeric replacement container ($\Delta V_{PE}$) begins with the volume of the glass container that is to be replaced. This volume can be expressed as the volume of glass of the container ($\Delta V_G$) which equals the external volume of glass ($EV_G$) minus the internal volume of glass ($IV_G$). With this as the starting volume, the amount added to the composition of the polymeric container in order to establish a comparable weight between the polymeric container and the glass container can be explained as follows. The polymeric materials are typically less dense than the glass used in conventional glass containers. As such, an additional volume of the polymeric material is required to establish the same "weight feeling" in the polymeric container to satisfy the end user of the polymeric container when that end user is used to and comfortable with the glass container. This additional added volume can be described as the added volume of polymeric material needed to achieve an equivalent weight feeling in the container in comparison to a glass container ($\Delta V_{PE}$). This amount of ideal added polymeric material to create the equivalent weight of the glass container in the polymeric container can equal the volume of glass ($\Delta V_G$) in the original glass container multiplied times the ratio of the specific gravity of the glass to the specific gravity of the polymer.

It has been discovered that the exact equivalent is not necessary as such a range of volume actually added is preferred and within the scope of this disclosure. This volume range can be expressed in a range, or percentage of the ideal volume of polymer to be added ($\Delta V_{PE}$). For example, one range of acceptable ($\Delta V_{PA}$) includes 0.7 to 1.3 of the ($\Delta V_{PE}$). Preferably this range is 0.8 to 1.2 ($\Delta V_{PE}$) and more preferably 0.9 to 1.1 ($\Delta V_{PE}$). In a more preferred embodiment the percentage of actual volume of the polymeric material added ($\Delta V_{PA}$) is actually less than the ideal amount of polymer used to equate the weight to the glass ($\Delta V_{PE}$). In this embodiment, there are ranges that are preferred including a range of 0.7 to 1.0 $\Delta V_{PE}$, and preferably 0.8 to 1.0 $\Delta V_{PE}$. In a most preferred embodiment, the value of $\Delta V_{PA}$ is between 0.81 and 1.0 $\Delta V_{PE}$.

Another feature of a polymeric container made in accordance with the current disclosure is the overall aesthetic feel and look as used by the consumer to partake of the liquid stored therein. It has been discovered that an adherence to a dimension ratio helps facilitate this aesthetic look and feel to the user. Since the overall volume of the polymeric container is increased in comparison to the glass container, an adjustment in the ratios of the diameter and length of the polymeric container are required. As such, a polymeric drinking container has increased dimensions in both diameter and length in comparison to the glass container to which it replaces. The adherence to the comparison ratios in diameters and length of the polymeric container with respect to the glass container maintains an overall dimensional feel and look in the polymeric container that is appeasing to the end user.

For example, the percentage increase of additional polymer with respect to the external volume of the glass container that is replaced can be indicated by $\Delta V_{P+}$. This number can be calculated by taking the volume of added polymer actually used ($\Delta V_{PA}$) and subtracting out the volume of the glass container that is replaced ($\Delta V_G$) and dividing that sum by the external volume of the original glass container ($EV_G$). That number is then multiplied by 100 to obtain the percentage increase in the material volume needed to achieve the weighted feel of the polymeric container. From this percentage, the amount increase in diameter and length of the polymeric container is determined.

For example, the percentage increase in the diameter and length can be between 0.25 and 0.14 of $\Delta V_{P+}$, more preferably between 0.30 and 0.36 $\Delta V_{P+}$ and most preferably at 0.333 $\Delta V_{P+}$. Alternately stated, the ratio of diameters to the polymeric container is ⅓ larger than the diameter of the glass container to which it is simulating. Correspondingly, the length of the polymeric container is ⅓ larger than the length of the glass container to which it replaces.

Another feature of the polymeric drinking container is the gradual increased thickness of the enclosed wall 14 from the opening 16 to the base 12. This gradual increase also facilitates the overall weighted feel of the polymeric container in comparison to the glass container which it replaces. This programmed and controlled thickness increase facilitates the clear appearance of the polymeric container once formed and facilitates sufficient rigidity in the polymeric drinking container to withstand its use as a drinking vessel. In a most preferred embodiment, the thickness of the walls of the polymeric container in relation to the glass container follows the same ratios as described above in reference to $\Delta V_{P+}$.

A polymeric drinking container made as just described will have several advantages which include a gradual uniformly increasing side wall thickness. This allows a functional transparency and clarity when the polymeric material is selected as a clear engineering thermoplastic. Additionally, there will be a lack of obvious or unwanted disruptions of light due to refraction or transmission in the polymeric container so constructed. Additionally, the polymeric container as mentioned has a weight that substantially matches, or simulates, that of the glass containers but has a rigidity and resistance to crunching that matches, or in most cases exceeds, that of glass containers. Typically the rigidity is proportional to the cube of the container sidewall thickness multiplied times the material modulus. In this instance, the polymeric material has increased rigidity and the gradual increase in the sidewall thickness along with the aforementioned dimensional adjustments and volume metric adjustments, has a profound effect on the container resistance to breaking and fragmenting. These engineered thermoplastics in the container have an excellent toughness and are resistant to abuse while having increased their durability. The thermoconductivity of the polymeric container is improved thus providing an approved cooling capacity for the polymeric container in relation to the glass container. This is facilitated by the material used and also in the increased wall thickness of the polymeric material and the polymeric container since the diffusion of heat is proportional to the square of the container wall thickness. In addition, there is a reduced tendency for moisture condensation on the outside of the polymeric container due to this improved cooling capacity. Additionally, there is an improved balance in resisting to tipping or toppling due to the predominance of the polymeric container weight being distributed towards the bottom portion or bottom half of the polymeric container.

In this container, the average container wall thickness of the polymeric container is proportional to the ratio of the specific gravity of the glass, such as 2.52 for soda lime glass, to that of the polymeric material selected, typically between 0.85 to 1.4 for those thermoplastics listed in Tables 1, 2 and 3. Additionally, since the wall thickness in the polymeric container is proportional and gradual along the length of the container, a majority of the weight ends up in the lower half of the polymeric container. This again improves the balance of the container and resistance to tipping and/or toppling.

Thus, although there have been described particular embodiments of the present invention of a new and useful POLYMERIC REPLACEMENT FOR A GLASS DRINKING CONTAINER it is not intended that such references be construed as limitations upon the scope of this invention except as set forth in the following claims.

What is claimed is:

1. A method of manufacturing a polymeric drinking container, comprising
   providing a core layer constructed of a first polymeric material;
   inserting the first core into a cavity;
   applying at least one over molded layer constructed of a second polymeric material to the core layer;
   cooling the at least one over molded layer and the core layer;
   inserting the cooled layers into an incrementally larger cavity; and
applying at least one additional over molded layer constructed of a third polymeric material to the applied at least one over molded layer;
   providing a mold for molding a molten thermoplastic polymer into a drinking container, the mold having at least two separable mold portions adjoined along a seam, the adjoined mold portions forming mold walls and a mold core that define a mold cavity;
   providing a plurality of first cooling lines adjacent to the mold walls and the seam and a plurality of second cooling lines adjacent to the mold walls but separated from the seam by at least one of the plurality of first cooling lines;
   cooling the plurality of first cooling lines to a first temperature and cooling the plurality of second cooling lines to a second temperature, wherein the first temperature is lower than the second temperature;
   injecting molten thermoplastic polymer into the cavity; and
   cooling the molten thermoplastic polymer to form the core layer of polymeric material.

2. The method of claim 1, wherein at least one of the first polymeric material, the second polymeric material, and the third polymeric material is a clear engineering thermoplastic.

3. The method of claim 2, wherein at least one of the first polymeric material, the second polymeric material, and the third polymeric material is chosen from polyethylene terephthalate, polyethylene terephthalate glycol, styrene acrylonitrile, polycarbonate, polymethylpentene, and polyvinylchloride.

4. The method of claim 3, wherein at least one of the first polymeric material, the second polymeric material, and the third polymeric material is chosen from polypropylene, polyethylene, polyethylene terephthalate, and polyvinylchloride and further includes at least one additive chosen from calcium carbonate, talc, aluminum silicate.

5. A method of manufacturing a polymeric drinking container, the method comprising:
   providing a mold for molding a molten thermoplastic polymer into a drinking container, the mold having at least two separable mold portions adjoined along a seam, the adjoined mold portions forming mold walls and a mold core that define a mold cavity;
   providing a plurality of first cooling lines adjacent to the mold walls and the seam and a plurality of second cooling lines adjacent to the mold walls but separated from the seam by at least one of the plurality of first cooling lines;
   cooling the plurality of first cooling lines to a first temperature and cooling the plurality of second cooling lines to a second temperature, wherein the first temperature is lower than the second temperature;
   injecting molten thermoplastic polymer into the cavity.

6. The method of claim 5, wherein the thermoplastic polymer is a clear engineering thermoplastic when solid.

7. The method of claim 6, wherein the thermoplastic polymer is chosen from polyethylene terephthalate, polyethylene terephthalate glycol, styrene acrylonitrile, polycarbonate, polymethylpentene, and polyvinylchloride.

8. The method of claim 6, wherein the thermoplastic polymer is chosen from polypropylene, polyethylene, polyethylene terephthalate, and polyvinylchloride and further includes at least one additive chosen from calcium carbonate, talc, aluminum silicate.

* * * * *